(No Model.)
P. HANSEN.
STUMP EXTRACTOR.
No. 507,121. Patented Oct. 24, 1893.
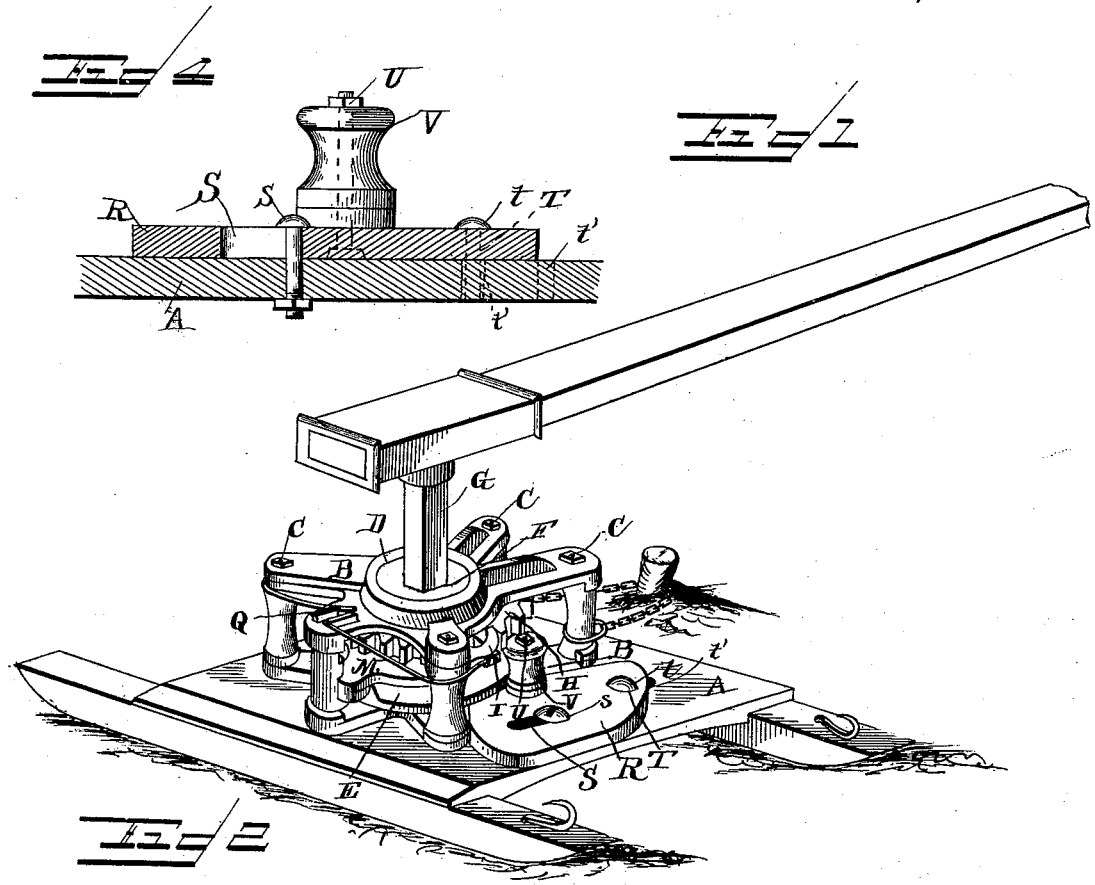
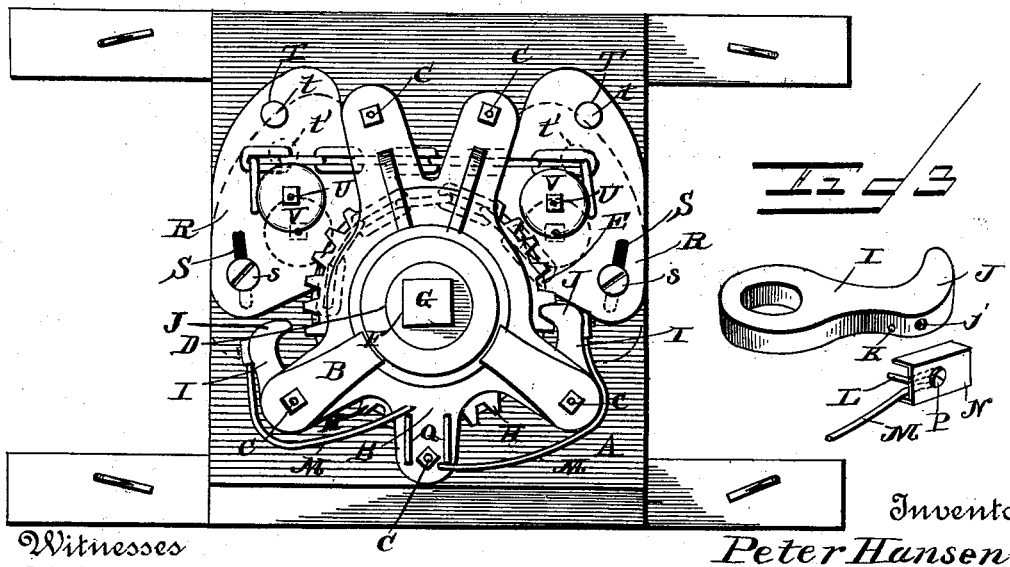
Witnesses
W. E. Schneider
Inventor
Peter Hansen
by C. A. Snow & Co
Attorneys

UNITED STATES PATENT OFFICE.

PETER HANSEN, OF ANTIGO, WISCONSIN.

STUMP-EXTRACTOR.

SPECIFICATION forming part of Letters Patent No. 507,121, dated October 24, 1893.

Application filed May 26, 1893. Serial No. 475,634. (No model.)

*To all whom it may concern:*

Be it known that I, PETER HANSEN, a citizen of the United States, residing at Antigo, in the county of Langlade and State of Wisconsin, have invented a new and useful Stump-Extractor, of which the following is a specification.

This invention relates to stump extractors; and it has for its object to provide certain improvements in chain stump extractors, whereby the same will be rendered more easily to manipulate, with greater safety, while at the same time having considerable power.

To this end the main and primary object of the present invention is to construct a machine having certain improvements over my former patent numbered 481,944, issued September 6, 1892, in order to provide a machine having the qualities referred to.

With these and many other objects in view which will readily appear as the nature of the invention is better understood, the same consists in the novel construction, combination and arrangement of parts hereinafter more fully described, illustrated and claimed.

In the accompanying drawings:—Figure 1 is a perspective view of a stump extractor constructed in accordance with my invention. Fig. 2 is a top plan view of the same showing both positions of the combined chain retaining and relieving rollers. Fig. 3 is a detail in perspective of one of the ratchet dogs showing the connection of one end of the spring arms thereto. Fig. 4 is an enlarged detail sectional view showing the adjustable connection of one of the roller plates to the sled frame.

Referring to the accompanying drawings, A represents a sled frame adapted to be moved from point to point and anchored in any suitable position convenient to the object to be extracted. The sled frame A, supports in position thereon the spaced frame plates B, connected by the clamping bolts C, and each provided with the bearings D, to receive the upper and lower journal ends of the horizontal chain wheel E.

The horizontal chain wheel E, is designed to revolve between the spaced frame plates B, and is provided in its upper journaled end with the squared vertical socket F, adapted to removably receive the lower squared end of the vertical operating shaft G. The removable vertical operating shaft G, is adapted to be controlled by an ordinary sweep or lever similar to that described in my former patent, and by reason of being removable allows the operating devices for the wheel to be removed out of the way when the machine is being drawn from place to place, and also to allow a new wheel to be placed in position, between the frame plates, when worn out or broken. The chain wheel E, is further provided at its upper surrounding edge with the projecting cog or ratchet flange H, which is adapted to be engaged, according to its direction of rotation, by either one of the oppositely arranged horizontal spring-actuated dogs I. The opposite spring-actuated dogs I, are pivotally mounted at one end on the opposite front clamping bolts of the machine, directly under the top frame plate, and are provided with outer curved engagement ends J, that are adapted to engage the teeth of said cog or ratchet flange, so as to permit the wheel to rotate freely in one direction, while preventing it from turning back in a direction opposite to that one direction. Each of the opposite horizontal spring-actuated dogs, I are further provided in their outer edges, near their moving ends, with the threaded openings $j$, and an adjacent pin opening K, which latter opening is adapted to receive the right angularly disposed pin L, at the loop extremity of the bowed spring arms M. The loop extremities of the bowed spring arms M, are inclosed by the cap plates N, fitting the outer edges of the dogs, and are clamped onto such dogs together with such cap plates by means of the screws P, passing through the cap plates and engaging the threaded openings in the dogs.

The bowed spring arms M, attached at one extremity to each of the dogs, embrace the opposite front corners of the machine frame and are adapted to have their free ends sprung over into engagement with either of the notched ends of the catch lugs arising centrally from the front top portions of the upper one of the frame plates B. Now it will be clear by reference to Fig. 2 of the drawings, particularly, that by throwing the free end of one of the spring arms M, over the inner end of one of the catch lugs Q, the dog to which that arm is attached will be held out of engagement with the cog or ratchet flange, so that by throwing the free end of the other spring arm into engagement with the outer notched end of the other catch lug, the opposite dog will be held, under the tension of the spring, into engagement with the cog or ratchet flange, so that the wheel can only turn in one direction. This of course can be reversed by changing the position of the dogs.

At each side of the chain wheel, in rear of the dogs adapted to engage the same, are adjustably mounted the flat roller plates R. The flat roller plates R, are provided near their front ends with the adjustment slots S, adapted to work over the stationary bolts s, passing through the same and engaging the sled frame, and the said plates are further provided near their opposite ends with the pin openings T, adapted to loosely receive the adjusting pins t, adapted to engage either one of the lock openings t', formed in the sled frame A. Each of the opposite roller plates R, carry the vertical spindles or journals U, on which are removably mounted the horizontal grooved combined chain retaining and relieving rollers V.

By reference to my former patent, referred to, the rollers just described are designed to be employed for the same purpose as the corresponding devices set forth in such patent, and it will be clear from the drawings, that by moving the roller plates toward the front end of the machine, and locking it in the limit of this movement by dropping the pins t, into one of the openings t', the rollers V, will be brought close up to the chain wheel and slightly underlapping the top flange thereof, so that they will serve in the capacity of retaining wheels, to hold the chain close into the chain wheel to prevent it from slipping out of position or clogging up before it had passed completely out of the wheel. On the other hand, by moving the plates R, back and away from the wheel E, and locking them in such position, the rollers V, will be carried sufficiently far away from the chain wheel, so that the chain can be taken out of the wheel and passed around such rollers as clearly indicated in Fig. 2 of the drawings, so that the chain can be freely drawn out from the machine to pay it out or completely remove it, without having to revolve the chain wheel. A further point to note is that the horizontal grooves of the rollers V, serve to take out any twist that might be in the chain.

From the foregoing it is thought that the construction and operation of the herein-described improvements will be now apparent, and I will have it understood that changes in the form, proportion and the minor details of construction as embraced within the scope of the appended claims, may be resorted to without departing from the principal or sacrificing any of the advantages of this invention.

Having thus described my invention, what I claim, and desire to secure by Letters Patent, is—

1. In a stump extractor, the spaced frame plates one of which is provided with separate catch lugs, a horizontal chain wheel mounted to rotate between said plates and provided at its upper surrounding edge with a cog or ratchet flange, and opposite dogs pivoted to suitable points of attachment and having extended spring arms adapted to be sprung into engagement with either end of said catch lugs, substantially as set forth.

2. In a stump extractor, the upper and lower frame plates, the upper of said plates being provided at a central intermediate point with projecting catch lugs having notched ends, a horizontal chain wheel mounted to rotate between said plates and provided with an upper cog or ratchet flange, spring-actuated dogs pivoted at one end under the upper frame plate and having curved engagement ends adapted to engage the teeth of said flange, bowed spring arms removably attached at one end of said dogs and adapted to have their other ends sprung into engagement with either of said catch lugs, substantially as set forth.

3. The combination with a frame having suitably arranged catch lugs and a winding wheel having a cog or ratchet flange; of oppositely pivoted dogs adapted to separately engage said cog or ratchet flange and each provided with a threaded opening and an adjacent pin opening, and bowed spring arms having loop ends provided with angularly disposed pins adapted to fit the pin openings of said dogs, cap plates embracing said loop ends, screws passing through said cap plates and engaging the threaded openings of the dogs to clamp the loop ends of the spring arms onto said dogs, the free ends of said spring arms being adapted to be sprung into engagement with either end of said catch lugs, substantially as set forth.

4. In a stump extractor, the combination with the horizontal rotating chain wheel; of the adjustable combined chain retaining and relieving rollers mounted at opposite sides of said wheels, substantially as set forth.

5. In a stump extractor, the combination with a horizontal chain wheel; of adjustable vertically supported horizontally grooved wheels arranged at opposite sides of the chain wheel and adapted to be moved up to and away from the same to retain the chain therein or relieve it therefrom, substantially as set forth.

6. In a stump extractor, the combination with the sled frame, and the horizontal chain wheel mounted on said frame; of the roller plates mounted for adjustment on the sled frame to and away from the said wheel, and horizontally grooved combined chain retaining and relieving rollers removably journaled on said roller plates, substantially as set forth.

In testimony that I claim the foregoing as my own I have hereto affixed my signature in the presence of two witnesses.

PETER HANSEN.

Witnesses:
W. B. BAKER,
B. JARDINE.